(12) United States Patent
Lu et al.

(10) Patent No.: US 8,427,813 B2
(45) Date of Patent: Apr. 23, 2013

(54) HIERARCHICAL NANOWIRE COMPOSITES FOR ELECTROCHEMICAL ENERGY STORAGE

(75) Inventors: Yunfeng Lu, Los Angeles, CA (US); Zheng Chen, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 175 days.

(21) Appl. No.: 13/020,484

(22) Filed: Feb. 3, 2011

(65) Prior Publication Data

US 2011/0235240 A1 Sep. 29, 2011

Related U.S. Application Data

(63) Continuation of application No. PCT/US2009/053527, filed on Aug. 12, 2009.

(60) Provisional application No. 61/089,221, filed on Aug. 15, 2008.

(51) Int. Cl.
*H01G 9/00* (2006.01)

(52) U.S. Cl.
USPC ........... 361/502; 361/503; 361/504; 361/512; 361/523; 361/528

(58) Field of Classification Search .................. 361/502, 361/503, 504, 509–512, 516–519, 523–525, 361/528–529
See application file for complete search history.

(56) References Cited

U.S. PATENT DOCUMENTS

| | | | |
|---|---|---|---|
| 6,205,016 B1 * | 3/2001 | Niu | 361/503 |
| 7,122,106 B2 * | 10/2006 | Lin et al. | 205/109 |
| 7,612,985 B2 * | 11/2009 | Dementiev et al. | 361/502 |
| 7,986,509 B2 * | 7/2011 | Seymour | 361/502 |
| 8,243,420 B2 * | 8/2012 | Kim et al. | 361/502 |
| 2006/0263688 A1 | 11/2006 | Guyomard et al. | |
| 2008/0013258 A1 | 1/2008 | Viswanathan et al. | |
| 2008/0248192 A1 * | 10/2008 | Long et al. | 427/80 |

FOREIGN PATENT DOCUMENTS

| | | |
|---|---|---|
| JP | 2007182352 A | 7/2007 |
| KR | 20070005611 A | 1/2007 |

OTHER PUBLICATIONS

Miller, J.R. et al.—Properties and Performance of Hybrid Aluminum Electrolytic/Electrochemical Capacitors—Evans Capacitor Company, Presented at the 16th Capacitors and Resistor Technology Symposium (CARTS), 1996, pp. 1-10.

Lee, J.Y. et al.—"Nickel oxide/carbon nanotubes nanocomposite for electrochemical capacitance"—Synthetic Materials 150, 2005, pp. 153-157.

Miller, J.M. et al.—"Deposition of Ruthenium Nanoparticles on Carbon Aerogels for High Energy Density Supercapacitor Electrodes"—Office of Naval Research Technical Report, Mar. 18, 1998, pp. 1-16.

(Continued)

*Primary Examiner* — Nguyen T Ha
(74) *Attorney, Agent, or Firm* — John P. O'Banion

(57) ABSTRACT

Provided is a new supercapacitor electrode material, comprising multiple interpenetrating networks of nanowires. More specifically, an interpenetrating network of metal oxide nanowires and an interpenetrating network of electrically conductive nanowires may form a composite film having a hierarchal porous structure. This hierarchically porous, interpenetrating network structure can provide the composite film with high capacitance, electrical conductivity and excellent rate performance. The present invention can be generalized towards other capacitor composites, opening a new avenue for a large spectrum of device applications.

19 Claims, 11 Drawing Sheets

OTHER PUBLICATIONS

Frackowiak, E.—"Carbon materials for supercapacitor application"—Physical Chemistry Chemical Physics, vol. 9, 2007, pp. 1774-1785.

Wu, N.L. et al.—"Enhanced performance of SnO2 xerogel electrochemical capacitor prepared by novel crystallization process"—Jour. of Power Sources, vol. 109, 2002, pp. 418-421.

Miller, J.R. et al.—"Electrochemical Capacitors: Challenges and Opportunities for Real-World Applications"—The Electrochemical Society Interface, Spring 2008, pp. 53-57.

An, K. et al.—"Electrochemical Properties of High-Power Supercapacitors Using Single-Walled Carbon Nanotube Electrodes"—Adv. Funct. Matter, vol. 11, No. 5, 2001, pp. 387-392.

Winter, M. et al.—"What are Batteries, Fuel Cells, and Supercapacitors?"—Chem. Rev., vol. 104, 2004, pp. 4245-4269.

WIPO, International Publication No. WO 2010/019648 dated Feb. 18, 2010, including international search report and written opinion issued on Mar. 2, 2010, from counterpart PCT Application No. PCT/US2009/053527, pp. 1-40.

Chinese Intellectual Property Office, related CN Appn. No. 200980140903.7, office action issued Mar. 29, 2012, English-language translation (pp. 1-2), Chinese-language office action (pp. 3-6), claims examined (pp. 7-9).

Zhu et al., "Preparation and catalytic behaviour of vanadium oxide nanowire-carbon nanotube composites", poster presented at 13th International Conference on Catalysis, Paris, France, Jul. 16, 2004, pp. 1-2.

* cited by examiner

FIG. 12A
FIG. 12B
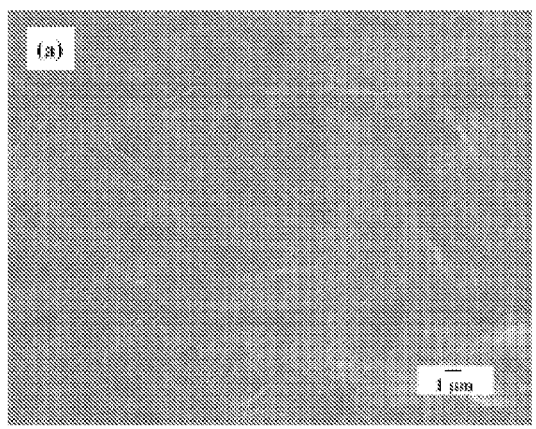
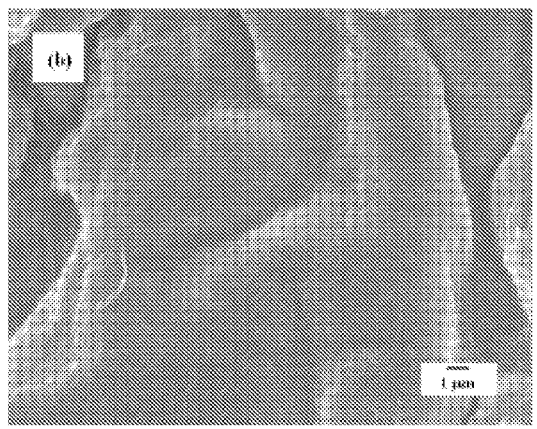
FIG. 12C
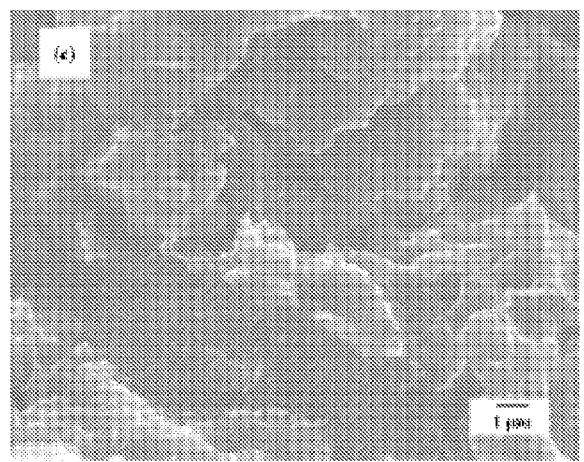

HIERARCHICAL NANOWIRE COMPOSITES FOR ELECTROCHEMICAL ENERGY STORAGE

CROSS-REFERENCE TO RELATED APPLICATIONS

This application is a continuation of PCT International Application No. PCT/US2009/053527 filed on Aug. 12, 2009, incorporated herein by reference in its entirety, which claims priority to U.S. Provisional Patent Application Ser. No. 61/089,221 filed on Aug. 15, 2008, incorporated herein by reference in its entirety.

This application is related to PCT Publication No. WO 2010/019648 published on Feb. 18, 2010, incorporated by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document may subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

The present invention relates generally to charge storage devices with at least one electrode that is composed of multiple networks of nanowires.

2. Description of Related Art

Electrochemical capacitors (also known as supercapacitors or ultracapacitors) have been attracting numerous interests because they can instantaneously provide higher power density compared to batteries and higher energy density compared to the conventional dielectric capacitors. Such outstanding properties make them excellent candidates for applications in hybrid electric vehicles, computers, mobile electric devices and other technologies.

Generally, an electrochemical capacitor may be operated based on the electrochemical double-layer capacitance (EDLC) formed along an electrode/electrolyte interface, or a pseudocapacitance resulting from a fast reversible faradic process of redox-active materials (e.g., metal oxides and conductive polymers). For an EDLC-based capacitor, the rapid charge/discharge process provides the capacitor with a high power density, yet the energy density is limited by its effective double-layer area.

To date, a large number of high-surface-area materials, such as activated carbon, templated carbon, and carbon nanotubes (CNTs), have been extensively studied. Activated carbons, with surface areas from $1000$ $m^2/g$ to $2500$ $m^2/g$, are the most commonly used materials, which may provide a capacitance up to 320 F/g at low potential scanning rate. However, the capacitance may drop dramatically at high scanning rates because of their tortuous pore structure and high microporosity. The templated carbons, on the other hand, exhibit uniform pore geometry and larger pore size; however, they did not show any exciting improvement in either energy or power performance. For comparison, multi-walled CNTs show capacitances up to 135 F/g and single-wall CNTs show capacitances up to 180 F/g, which are still low for an actual device application.

Compared with the EDLC-based capacitors, pseudocapacitors based on transition metal oxides or conducting polymers may provide much higher specific capacitances up to one thousand farads per gram of the active material. However, their actual applications are still limited by high cost, low operation voltage, or poor rate capability, mostly because of inefficient mass transport or of slow faradic redox kinetics. Specifically, such high electrical resistance can limit the practical thickness (smallest dimension) of oxide electrodes, as increased thickness leads to increased electrode resistance and reduced charge transport.

Hybrid capacitors have been fabricated that integrate both the electric double-layer capacitance and pseudocapacitance within a single electrode. For example, ruthenium oxide nanoparticles have been loaded onto activated carbon, composites of $MnO_2$ nanoparticles have been loaded on templated carbon, and ruthenium oxide nanoparticles have been loaded on carboxylated CNTs. Thin layers (6 nm) of vanadium-oxide nanoparticles have been electrodeposited on CNTs. However such composite thin films with low oxide loading levels and/or low film thickness may not be suitable for practical applications.

Consequently, in spite of extensive research and effort, making supercapacitors with high energy and power density still remains challenging. Supercapacitors electrodes of the prior art have not provided the device performance (e.g., energy density, power density, cycling stability, operating voltage) and manufacturability required for many high-performance, commercial applications.

BRIEF SUMMARY OF THE INVENTION

The present invention describes supercapacitors with enhanced energy density and power density, achieved largely through use of electrodes that incorporate multiple networks of nanowires. For example, a supercapacitor according to embodiments of the present invention may comprise a first electrode formed from a network of oxide nanowires interpenetrated with a network of electrically conducting nanowires (e.g., carbon nanotubes). Nanowires have attracted a great deal of recent attention due to their exceptional material properties. Nanowires may include, but are not limited to, carbon nanotubes (e.g., single-walled carbon nanotubes (SWNTs), multi-walled carbon nanotubes (MWNTs), double-walled carbon nanotubes (DWNTs), few-walled carbon nanotubes (FWNTs)), metallic nanowires (e.g., Ag, Ni, Pt, Au), semiconducting nanowires (e.g., InP, Si, GaN), oxide nanowires (e.g., $SiO_2$, $TiO_2$, $V_2O_5$, $RuO_2$, $MoO_3$, $MnO_2$, $Co_3O_4$, $NiO$), organic nanowires and inorganic nanowires. As used herein, the term "nanowire" includes any structure that has at least one dimension between about 1 nm and 100 nm, and an aspect ratio with respect to that dimension of at least 10

(e.g., a carbon nanotube with a diameter of 10 nm and a length of 1000 nm). Nanowire networks may comprise at least one interconnected network of such nanowires (e.g., wherein nanowire density of a network or of multiple networks is above a percolation threshold). Nanowire networks may also comprise multiple interpenetrating networks (e.g., first and second networks of nanowires, the elements of which are interspersed) (see, e.g., FIG. 1).

In certain embodiments of the present invention, a supercapacitor electrode comprises a first network of nanowires and a second network of nanowires, wherein the first network of nanowires and the second network of nanowires are interpenetrating. The first network of nanowires and the second network of nanowires may form hierarchical porous channels, e.g., wherein substantially all pores have diameters less than 20 nm or greater than 100 nm. The first network of nanowires may comprise metal oxide nanowires (e.g., $V_2O_5$ nanowires), and the second network of nanowires may comprise electrically conductive nanowires (e.g., carbon nanotubes). The metal oxide nanowires may be present in the electrode at a concentration of at least 10 wt-%. Alternatively, it may be advantageous to incorporate metal oxide nanowires in the electrode at higher concentrations, e.g., at least 80-90 wt-% (i.e., with about 10 wt-% CNTs, or less), and such compositions are enabled by methods described in the present application. The electrode may have a thickness greater than 1 micron and/or greater than 1 millimeter. The electrode may be electrically conductive, e.g., having an electrical conductivity of at least about 0.01 S/cm.

In certain embodiments of the present invention, the metal oxide nanowires may be present in the electrode at a concentration of at least 33 wt-%, and the electrically conductive nanowires are present in the electrode at a concentration of at least 20 wt-%. The electrode may have a capacitance of at least 440 F/g at the current density of 0.25 A/g.

In further embodiments of the present invention, a supercapacitor may comprise a first electrode, a second electrode and an electrolyte, wherein at least one of the first electrode and the second electrode comprises multiple interpenetrating networks of nanowires as described above.

In other embodiments of the present invention, methods of fabricating an electrode formed from multiple interpenetrating networks of nanowires are described.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIGS. 12A, 12B and 12C are SEM images of nanocomposites according to certain embodiment of the present invention and having different compositions: (a) CVC-1, (b) CVC-3 and (c) CVC-4.

Features, elements, and aspects of the invention that are referenced by the same numerals in different figures represent the same, equivalent, or similar features, elements, or aspects in accordance with one or more embodiments of the system.

DETAILED DESCRIPTION OF THE INVENTION

Referring more specifically to the drawings and the description below, for illustrative purposes the present invention is embodied in the system(s), apparatus(es), and method (s) generally shown and described herein, as well as their equivalents. As used herein, the term "substantially" shall mean that at least 40% of components are of a given type.

Figure 1:
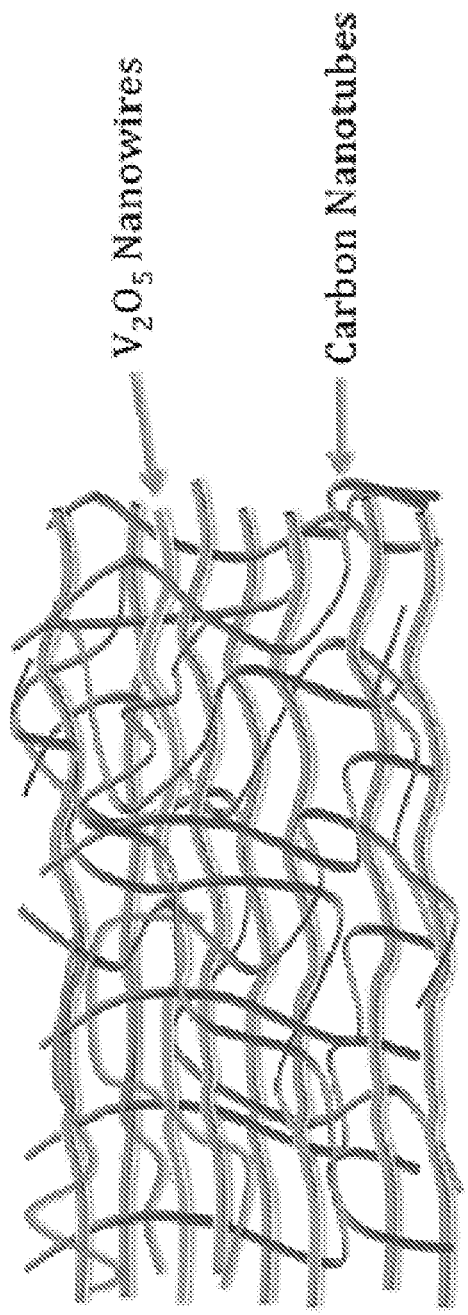
FIG. 1 is a schematic representation of a composition of matter according to certain embodiments of the present invention, and based on interpenetrating networks of CNTs and $V_2O_5$ nanowires.

Referring to FIG. 1, a novel supercapacitor electrode according to an embodiment of the present invention is comprised of a composite of interpenetrating CNTs and $V_2O_5$ nanowires. This unique architecture may be advantageous in supercapacitor applications, for example where: 1) the small dimension of the CNTs and the $V_2O_5$ nanowires provide high surface areas, leading to a high EDLC and better utilization of the $V_2O_5$ active sites (higher specific pseudocapacitance); 2) the interpenetrating CNT/$V_2O_5$ nanowire structure creates hierarchical porous channels, enabling effective electrolyte transport and active-site accessibility; 3) the $V_2O_5$ nanowires are intimately intertwined with highly conductive CNTs, facilitating a faster electron transport and efficient current collection.

In certain exemplary embodiments according to the present invention, novel CNT/$V_2O_5$ nanowire composites were synthesized using a one-pot hydrothermal approach. Briefly, multi-wall CNTs were firstly modified to attach carboxylic groups on the surface. Hydrothermal reaction of vanadium-oxide precursors in the presence of the modified CNTs led to the formation of the aforementioned composites.

Figure 2A:
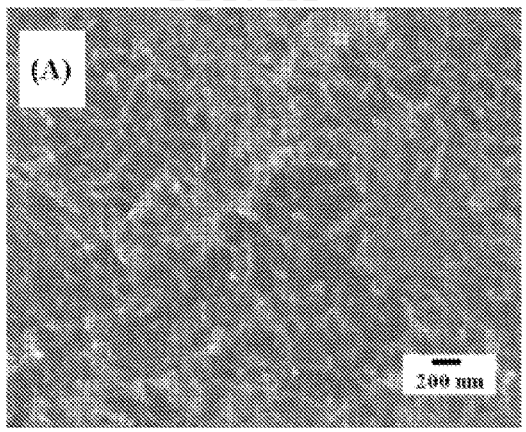
FIGS. 2A and 2B are (A) scanning electron microscope (SEM) and (B) transmission electron microscope (TEM) images of modified CNTs according to certain embodiments of the present invention.
Figure 2B:
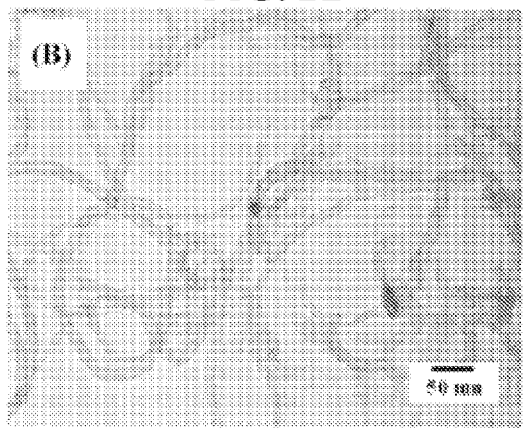
Figure 2C:
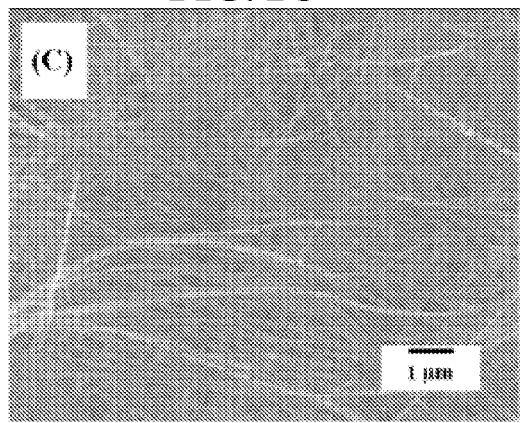
FIGS. 2C and 2D are (C) SEM and (D) TEM images and selective area electron diffraction (SAED) (insert) of $V_2O_5$ nanowires according to certain embodiments of the present invention.
Figure 2D:
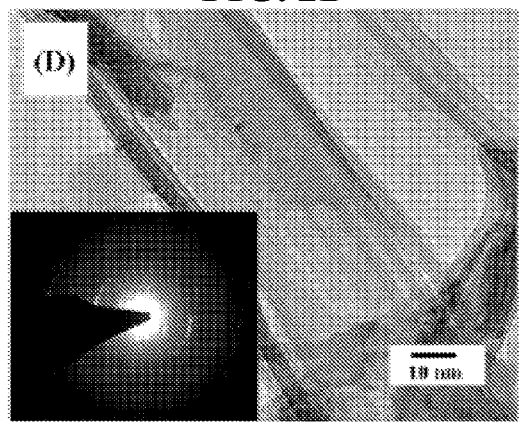
Figure 2E:
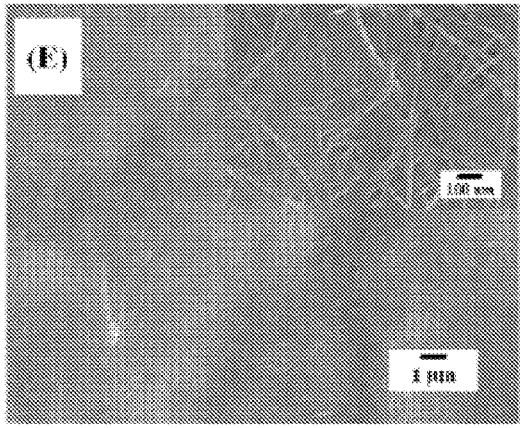
FIGS. 2E and 2F are SEM images of CVC-2 (E) before and (F) after etching, which show an interpenetrating structure.
Figure 2F:
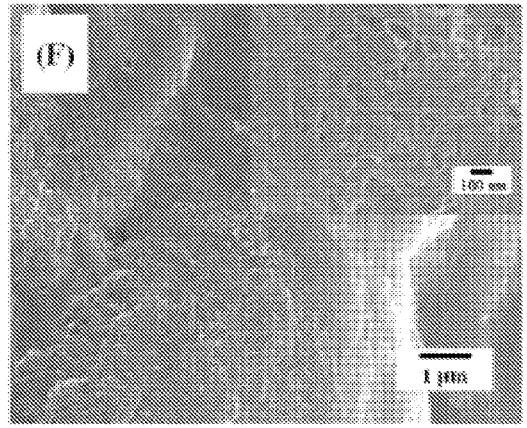

Referring to FIGS. 2A-2F, scientific analysis has confirmed the novel structure and morphology of the nanowire composites of the present invention. FIGS. 2A and 2B show representative (A) SEM and (B) TEM images of the CNTs in an exemplary embodiment, revealing a porous network of entangled CNTs with diameters around 20-30 nm and lengths up to micrometers. Similarly, the diameter of the $V_2O_5$ nanowires in this exemplary embodiment is around 20-50 nm and length is up to tens of micrometers (SEM image, FIG. 2C). A high resolution TEM image (FIG. 2D) shows that the $V_2O_5$ nanowires contain an ordered layered structure; selective area electron diffraction (SAED) pattern (Inset, FIG. 2D) suggests that they are single crystalline. In-situ growth of the $V_2O_5$ nanowires within the porous CNT networks led to the formation of flexible, dark-brown nanocomposites (FIG. 11a), of which the $V_2O_5$ nanowire loading was engineered by tuning the ratio of CNTs to the $V_2O_5$ precursor used. FIG. 2E shows an SEM image of a representative composite with 30 wt-% of CNTs (CVC-2), showing a continuous fibrous structure with pores up to microns in diameter.

Figure 3A:
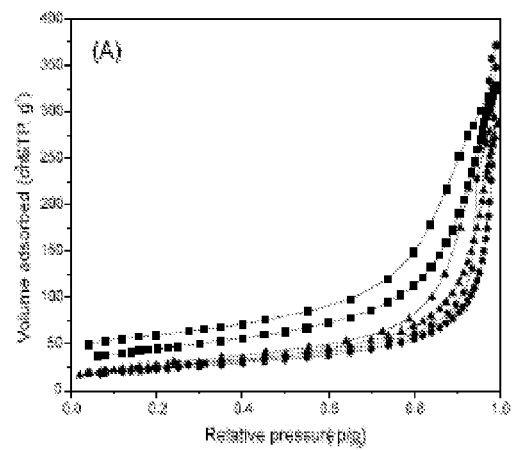
FIGS. 3A and 3B are (A) nitrogen sorption isotherms and (B) pore size distributions of CNTs (■), V2O5 nanowires (●) and CVC-2(▲).
Figure 3B:
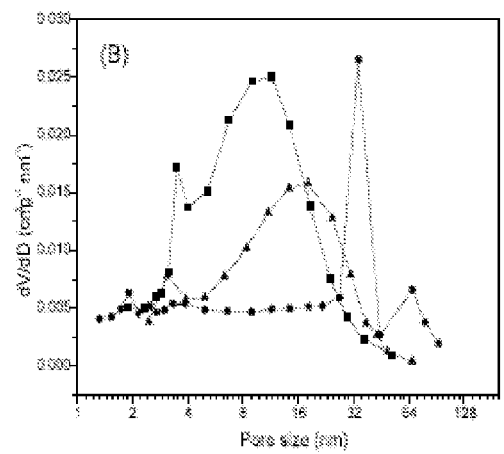

Referring to FIGS. 3A and 3B, FIG. 3A shows nitrogen sorption isotherms of the CNTs, $V_2O_5$ nanowires and CVC-2, all of which are similar in shape. The CNTs show a surface area of 150 m$^2$/g, pore volume of 0.488 cm$^3$/g, and an average pore diameter of 12.5 nm (FIG. 3B). The $V_2O_5$ nanowires show a lower surface area of 83 m$^2$/g, larger pore diameter of 26.7 nm, and a pore volume 0.552 cm$^3$/g. The CVC-2 exhibits a comparable surface area of 125 m$^2$/g and average pore size of 15.2 nm, evidencing that the composite is hierarchically porous. The composites with different CNT loadings display a similar porous fibrous structure (FIGS. 12A-12C, Table 1); the morphology of the composites with high CNT content is generally less uniform with more CNTs exposed on the surface. This hierarchical structure can be advantageous (e.g., compared with strictly mesoporous structures of the prior art) in ensuring good capacitance performance, since the large pore channels (e.g., macropores) allow rapid electrolyte transport; while the small ones (e.g., micropores) provide the composites with higher surface areas and more surface active sites. In certain embodiments of the present invention, substantially all pores have diameters less than 20 nm or greater than 100 nm.

Figure 3C:
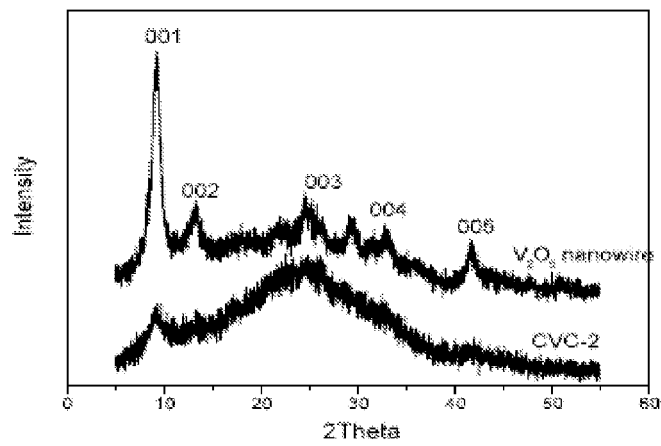
FIG. 3C is a graph showing XRD patterns of $V_2O_5$ nanowires and the CVC-2 composite.

Referring to FIG. 3C, in-situ growth of the $V_2O_5$ nanowires within the CNT network leads to an interpenetrating nanowire network structure. X-ray diffraction (XRD) indicates that the free-growth $V_2O_5$ nanowires are highly crystalline with well-defined (001) reflections at two-theta degree of 9.1, 13.5, 25.5, 32.5 and 42.0, consistent with the lamellar structure shown in the FIG. 2D. The CVC-2 composites show similar reflections but with significantly lower intensity, indicating the nanowires grown within the composites may contain smaller crystalline domains. Partial removal of the $V_2O_5$ nanowires using 1% HF solution exposed the constituent CNT networks on the composite surface (FIG. 2F), further confirming the interpenetrating network structure. This interpenetrating network structure creates intimate contact between the nanowire networks (e.g., CNT network and $V_2O_5$ nanowire network) enabling rapid charge transport to the current collector through the highly conductive CNT network. Representative CVC-2 composite electrodes registered a DC conductivity of $1.2 \times 10^{-2}$ S/cm (a nearly 40× improvement over that of representative $V_2O_5$ electrodes, which registered a DC conductivity of only $3.1 \times 10^{-4}$ S/cm). Note: the electrical conductivity of composite electrodes according to embodiments of the present invention may be engineered through, for example, material selection (e.g., type of electrically conductive nanowires) and loading level; those skilled in the art will recognize that maximizing electrical conductivity may not result in optimal supercapacitor electrode performance (e.g., lower loading of electrically conductive nanowires may provide adequate electrical conductivity, while allowing increased loading of metal oxide nanowires).

Figure 4:
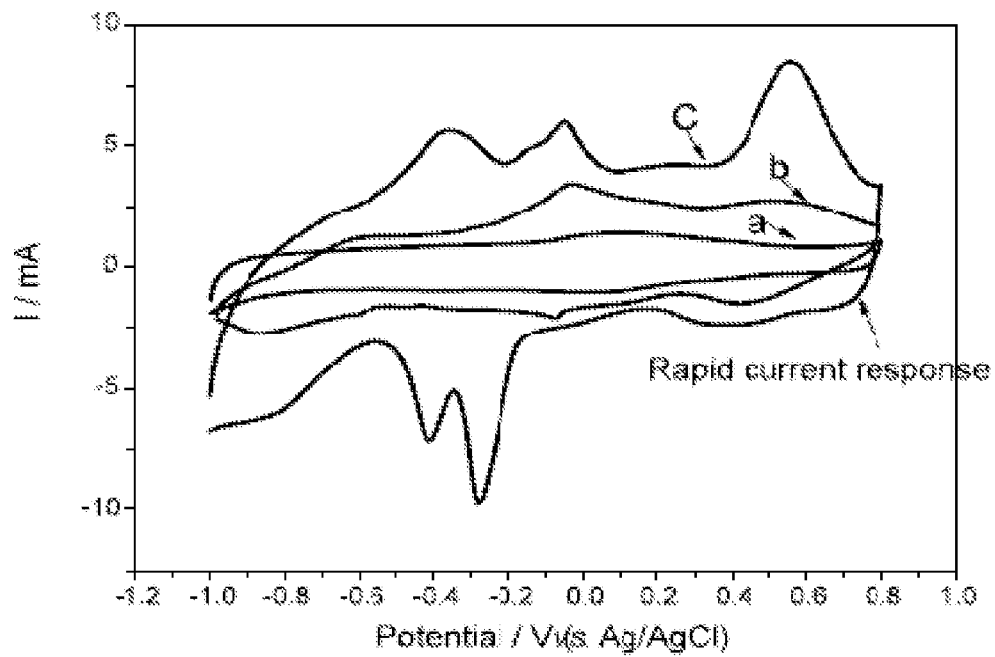
FIG. 4 is a graph showing cyclic voltammograms (CVs) of (a) CNTs, (b) $V_2O_5$ nanowires and (c) CVC-2 electrodes at a scanning rate of 10 mV/s in 1 M $Na_2SO_4$ aqueous solution at room temperature.

Referring to FIG. 4, the unique hierarchical architecture characterized by certain embodiments of the present invention endows the composites with high capacitance and rate capability. FIG. 4 shows cyclic voltammograms (CVs) of the CNT, $V_2O_5$ nanowire, and CVC-2 electrodes. The CNT electrode shows vague peaks at 0.12V and 0.05V, which can be attributed to the anodic oxidation and cathodic reduction of the surface carboxyl groups. The $V_2O_5$ nanowire electrode show two broad peaks of anodic oxidation (0.50 and −0.05 V) and reduction (0.35 and −0.10 V), which are typical for the crystalline $V_2O_5$ nanowires. For comparison, the composite electrode shows a rectangular-shape CV curve with a much larger area indicating a much higher capacitance. Furthermore, the redox peaks (anodic peaks at 0.51, −0.10 −0.40 V, cathodic peaks at 0.37, −0.28, −0.42) are much better defined, suggesting a more pronounced contribution of redox capacitance to the overall capacitance. Such three-redox pairs are rare in a $V_2O_5$—$Na_2SO_4$ aqueous electrolyte system, which may be due to the ion (e.g., Na+) insertion and de-insertion reactions at different energy states. Moreover, as shown by curve C in FIG. 4, the current of the nanocomposite electrode responds to the switching potential rapidly, particularly at the potential switching point of 0.8 V, indicating the composite electrode exhibits a lower equivalent series resistance (ESR) than that of the $V_2O_5$ nanowire electrode. A small ESR is vital to achieve a high rate capability and power density, since the maximum power density (Pmax) of a capacitor is generally determined by Pmax=$V_i^2$/4R, where $V_i$ is the initial voltage and R is the ESR from electrode materials, electrolyte, and the contact resistance between electrode and current collector.

Figure 5:
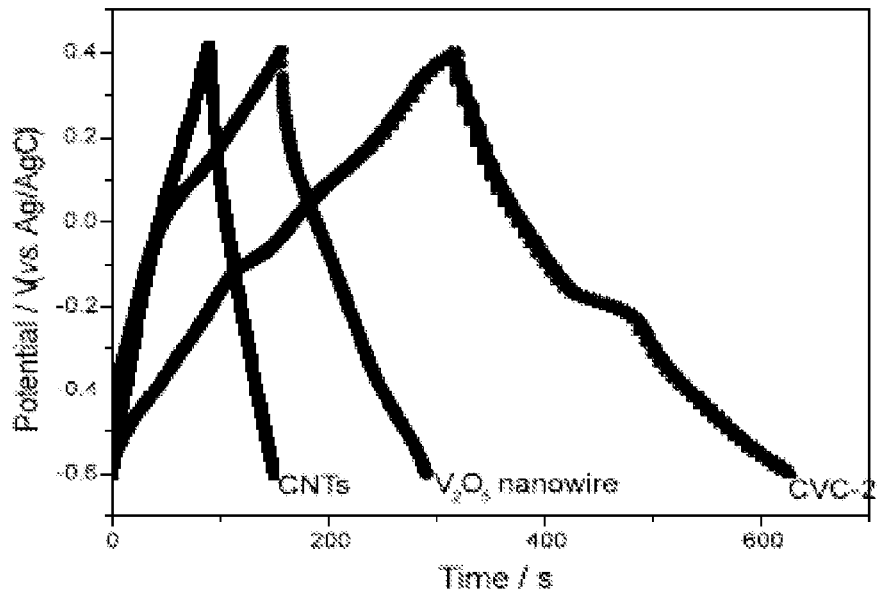
FIG. 5 is a graph showing galvanostaic charge-discharge curves of CNTs, $V_2O_5$ nanowires and CVC-2 electrodes at a charge-discharge current density of 1 A/g.

Referring to FIG. 5, galvanostaic charge-discharge curves were measured in the same working cells to further quantify their specific capacitances. FIG. 5 shows the charge-discharge curves of the CNT, $V_2O_5$ nanowire and CVC-2 electrodes at the current density of 1 A/g. The CNT electrode shows nearly linear charge and discharge curve, an indication of an ideal EDLC behavior with a specific capacitance of 75 F/g. The $V_2O_5$ nanowire electrode shows similar charge-discharge curves with a slightly increased curvature, indicating that EDLC is still the primary contribution to the overall capacitance, which is 146 F/g. Note that $V_2O_5$ may provide a pseudocapacitance as high as 530 F/g, and poor conductivity of the $V_2O_5$ nanowires may attribute to the poor use of its pseudocapacitance. Intimately weaving these poorly conductive $V_2O_5$ nanowires with the highly conductive nanowires (e.g., CNTs) into the composites led to dramatic increased capacitances. Indeed, the charge-discharge plots of the composite electrode displays a pronounced transition between the two linear ranges, indicating the capacitance is contributed from both EDLC and pseudocapacitance. The specific capacitance calculated is around 313 F/g, which is significantly higher than that of the CNTs (75 F/g) and the $V_2O_5$ nanowires (146 F/g). Since the surface area of the composite (125 m$^2$/g) is less than that of the CNTs (150 m$^2$/g), such a high capacitance can be attributed to the synergic effect of the composite constituents with the unique hierarchical structure. Considering the energy density of a capacitor is generally determined by $E=CV_i^2/2$, where C is the capacitance, composites with high capacitance are of great interest for high-energy-density device applications.

Figure 6A:
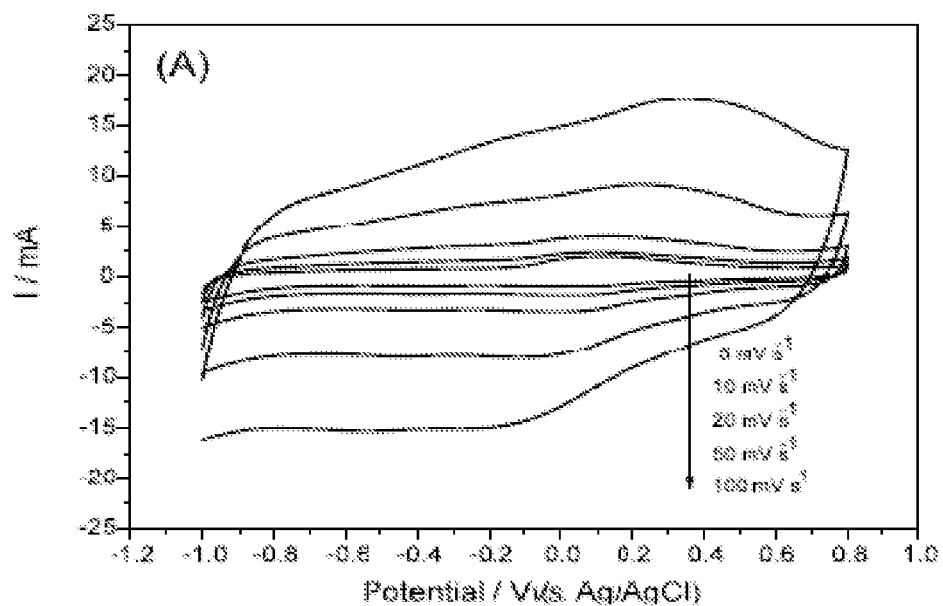
FIGS. 6A, 6B and 6C are graphs showing CV curves of (A) CNT, (B) $V_2O_5$ nanowire and (C) CVC-2 electrodes at various potential scanning rates from 5 to 100 mV/s in 1 M $Na_2SO_4$ aqueous solution at room temperature.
Figure 6B:
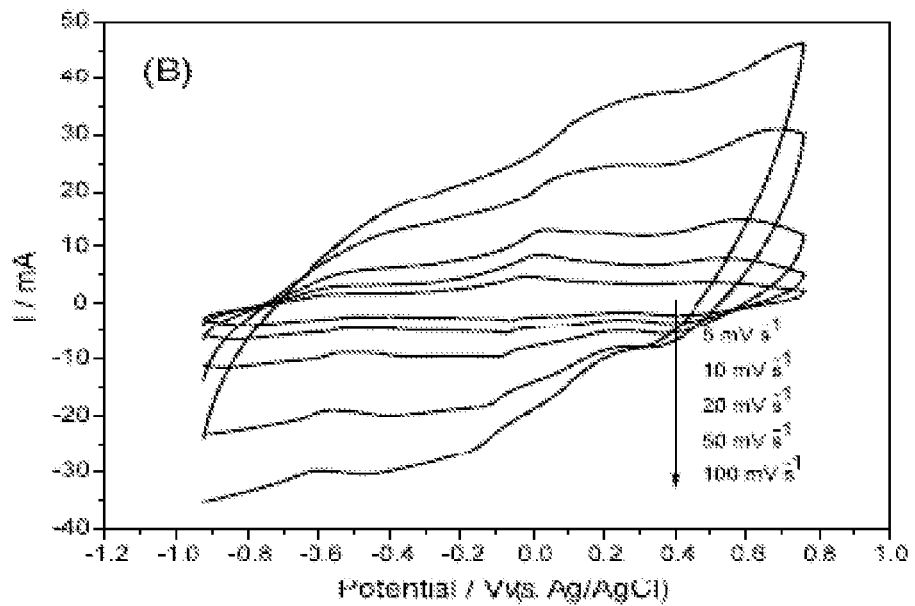
Figure 6C:
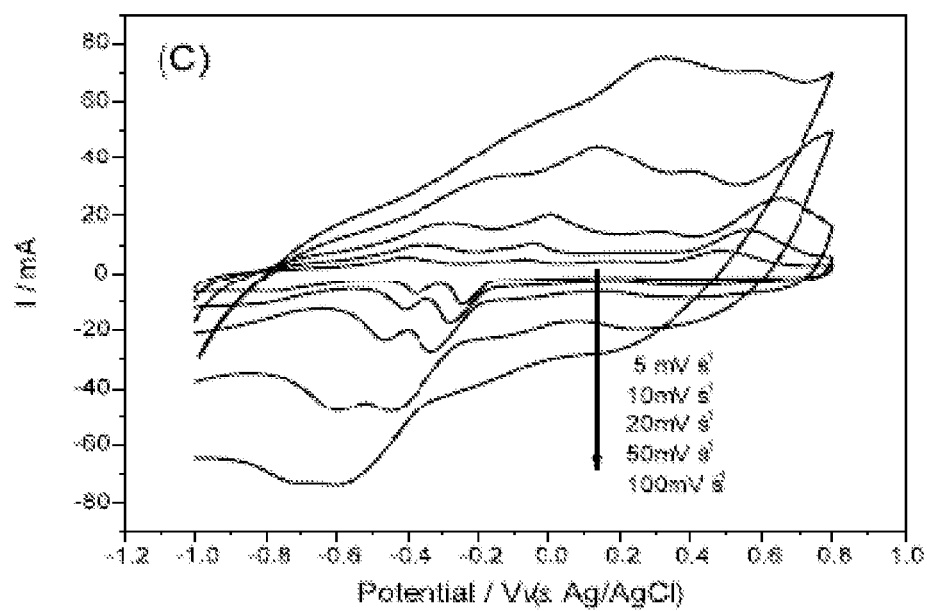

Referring to FIGS. 6A-6C, to further quantify their rate performance, CV studies at different scanning rates (5 to 100 mV s$^{-1}$) were conducted with CNTs and CVC-2 electrodes. Due to its excellent conductivity and porous structure, the CNT electrode shows excellent power performance, evidenced by the rectangular shape of its CV curves at the high scanning rates (see FIG. 6A).

Consistent with its poor conductivity, the $V_2O_5$ nanowire electrode shows a poor rate capability evidenced by its highly-distorted CV curves at high scanning rates (FIG. 6B). As expected, CV curves of the composite electrode CVC-2 maintain their rectangular shape even at high scanning rates (FIG. 6B), which is more pronounced for the composites with higher content of CNTs. Compared with the CV curves of the CNT electrode, the slight shape distortion is due to the overlapping effect of the two different energy-storage mechanisms, nevertheless, the data fully confirms the excellent rate performance of the composites of the present invention. The unique composite structure integrates the high rate performance of the CNT constituent with the high capacitance of the $V_2O_5$ nanowire constituent, leading to the synergic energy storage materials. Nevertheless, CNTs have low energy density whereas $V_2O_5$ nanowires have poor rate performance; extensive engineering of the composition was therefore essential to achieve high capacitance performance.

Figure 7:
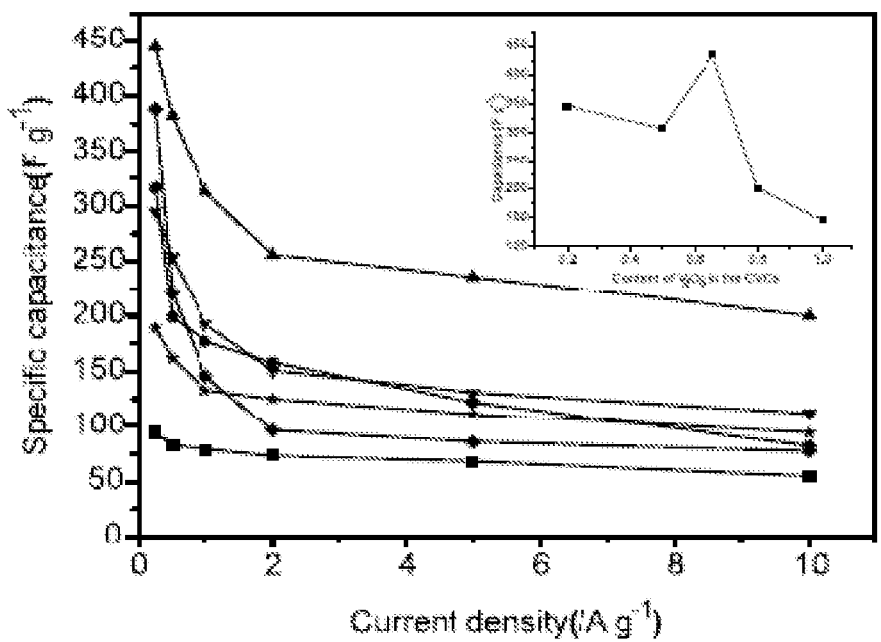
FIG. 7 is a graph showing the gravimetric capacitance of the composite electrodes with different CNT contents at different current densities: CNT electrode (■), $V_2O_5$ nanowire electrode (♦), CVC-1 (●), CVC-2 (▲), CVC-3 (▼) and CVC-4 (★).

Referring to FIG. 7, the CVC-2 electrode shows the highest specific capacitance at different current densities. It affords a capacitance of 440 F/g at the current density of 0.25 A/g and preserves about 50% capacitance retention (200 F/g) even at the current density of 10 A/g. For comparison, the CNT electrode shows more than 60% capacitance retention at the same condition; however, its overall capacitance is low (55 F/g at the current density of 10 A/g). Similarly, although the $V_2O_5$ nanowire electrode shows a high capacitance at low discharge rates (e.g., 388 F/g at the current density of 0.25 A/g), only 20% of the capacitance is retained at the current density of 10 A/g, showing a poor rate capability.

The inserted plot in FIG. 7 illustrates the $V_2O_5$-based specific capacitances of the composites versus the $V_2O_5$ content at the current density of 1 A/g. The composite electrodes consistently show much higher specific capacitance than that of the pure $V_2O_5$ nanowire electrode, indicating that the CNT scaffold indeed facilitates the harvest of the $V_2O_5$ nanowire pseudocapacitance. The CVC-2 electrode exhibits the highest overall capacitance and $V_2O_5$-based specific capacitance. These charge-discharge behaviors are in good consistence with the results from the cyclic voltammograms.

Figure 8A:
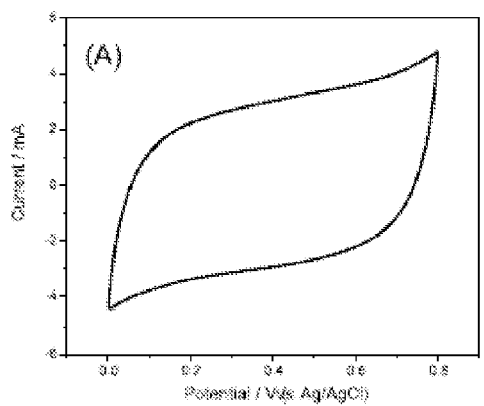
FIGS. 8A and 8B are (A) CV curves of mesoporous carbon supported $MnO_2$ ($MnO_2$/C) at scanning rate of 10 mV/s in 1 M aqueous $Na_2SO_4$ solution and (B) galvanostaic charge-discharge curves of $MnO_2$/C at a current density of 0.1 A/g at room temperature.
Figure 8B:
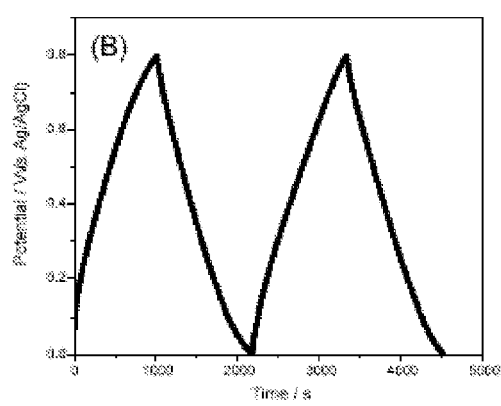
Figure 9A:
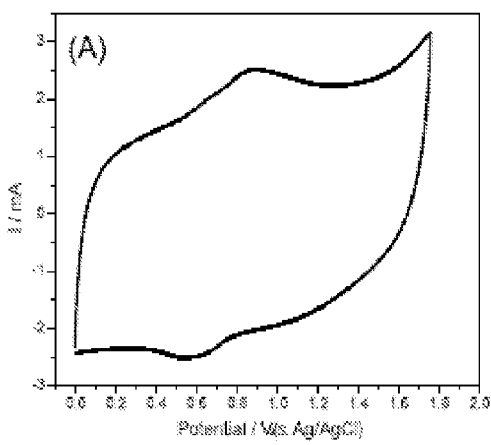
FIGS. 9A and 9B are (A) a CV curve of an asymmetric supercapacitor with a CVC-2 anode and an $MnO_2$/C cathode at scanning rate of 10 mV/s; and (B) galvanostaic charge-discharge of the asymmetric supercapacitor at different current densities (0.64 mA/$cm^2$, 3.2 mA/$cm^2$, 6.4 mA/$cm^2$) in 1 M aqueous $Na_2SO_4$ solution at room temperature.
Figure 9B:
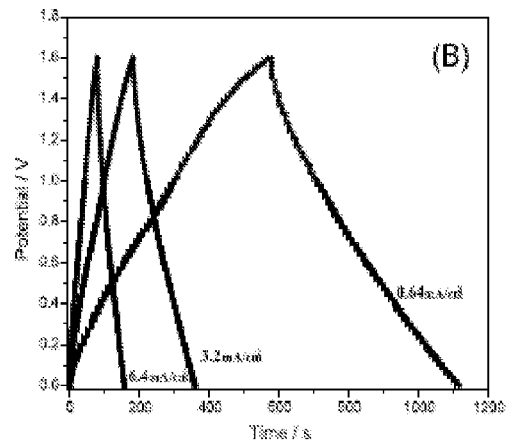

Referring to FIGS. 8A, 8B, 9A and 9B, to further evaluate the nanocomposite electrodes of the present invention for real device applications, supercapacitors were assembled using CVC-2 as the anode and $MnO_2$/C composite as the cathode. The typical cyclic voltammogram of the $MnO_2$/C electrode is shown in FIG. 8A. The rectangular-shaped CV plot indicates the ideal capacitive behavior of the electrode. Galvanostaic charge-discharge curves of $MnO_2$/C electrode at current density of 0.1 A/g reveals that the electrode material can provide a specific capacitance of 145 F/g, as calculated from FIG. 8B.

For the supercapacitor consisting of CVC-2 and $MnO_2$/C electrodes, an ideal capacitive behavior was observed from 0~1.6 V in 1 M $Na_2SO_4$ (FIG. 9). A capacitance of 45 F/g (based on the total weight of the anode and cathode materials) was achieved at the discharge current density of 0.64 mA/cm$^2$, corresponding to an energy density of 16 Wh/kg at power density of 75 W/kg. The device still possesses an energy density of 5.5 Wh/kg even at power density of 3750 W/kg and retains more than 90% of the initial capacitance after 100 cycles of charge and discharge, indicative of high power performance and good cycling stability.

Figure 10:
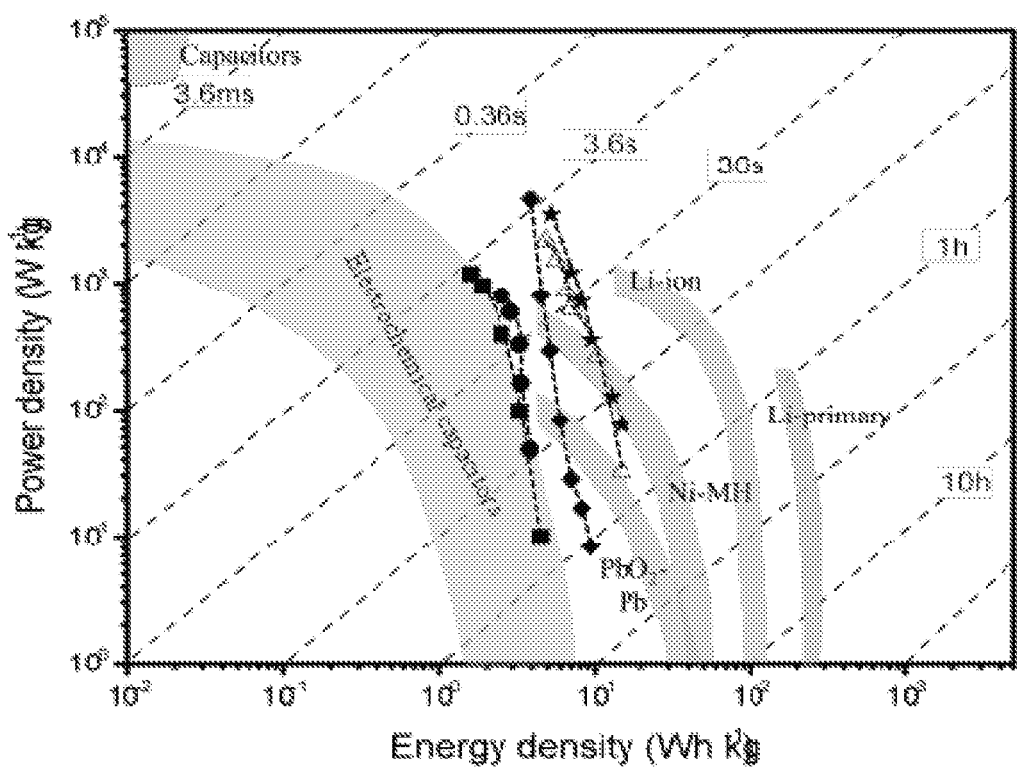
FIG. 10 is a Ragone plot of an asymmetric supercapacitor (★) consisting of a CVC-2 anode and an $MnO_2$/C cathode compared with carbon-based supercapacitors from active carbon (■), mesoporous carbon CMK-3 (●), hierarchical porous graphitic carbon (♦), and phosphorus-enriched carbon (Δ).

Referring to FIG. 10, a Ragone plot derived from the constant-current charges and discharges (FIG. 9B) of the supercapacitor, in comparison with some advanced aqueous-based supercapacitors from recent literature, shows that the energy and power performance of this supercapacitor are highly competitive with Ni-MH batteries and significantly improved over the current electrochemical capacitors. Considering the specific capacitance of the cathode materials ($MnO_2$/C) is below 150 F/g (FIG. 8B), an even higher energy density could be realized if a better cathode material is available. Moreover, considering that the CNT, $V_2O_5$ precursor, and processing can be achieved at the cost comparable to that of traditional carbon-based devices; these composites hold great promises as the next generation electrical energy storage materials.

In one exemplary embodiment of the present invention, synthesis of the CNT/$V_2O_5$ nanowire composites was performed by functionalizing multi-wall CNTs to attach carboxylic groups to their surfaces. Briefly, pristine CNTs (12.0 g), $HNO_3$ (65%, 100 mL) and $H_2SO_4$ (98%, 300 mL) were mixed in a flask, vigorously stirred and reflux for 100 min. The mixture was diluted with deionized (DI) water, filtered, and re-dispersed in water. This process was repeated until the pH of the filtrate was around neutral. The functionalized CNTs were then dried in vacuum oven for 24 h at 80° C. A hydrothermal method was used to synthesize the composites. Briefly, appropriate amount of the modified CNTs, 0.15 g of ammonium metavanadate ($NH_4VO_3$) and 0.25 g of surfactant P123 ($EO_{20}PO_{70}EO_{20}$, where EO and PO are ethylene oxide and propylene oxide, respectively) were mixed under ultrasonication for 10 min. After stirring for one hour, the mixtures were transferred to a 20 mL Telflon-lined autoclave and heated to 120° C. for 24 h. The resulting precipitates were filtered and rinsed with water and acetone several times and dried at 80° C. for 12 h under vacuum. The amounts of CNTs used were varied from 0.037, 0.078, 0.15 to 0.6 g, resulting in the composites with 20, 33, 50, and 67 wt-% of the CNTs, which were denoted as CVC-1, CVC-2, CVC-3 and CVC-4, respectively. Corresponding $V_2O_5$ nanowire concentrations in exemplary embodiments of the present invention varied from 10 wt-% to 80 wt-%.

Synthesis of mesoporous carbon supported $MnO_2$ ($MnO_2$/C): mesoporous carbon was synthesized using sucrose as carbon source and silica cluster and colloid as templates. Simply, 0.1 g of as-prepared mesoporous carbon was soaked into a flask containing 100 mL of 0.1 M $KMnO_4$ aqueous solution under vacuum for 10 min. The mixture was kept stirring at 50° C. for 2 h for direct growth of $MnO_2$ onto the carbon surface. After the reaction, the as-derived powder was washed with DI-water several times and dried at vacuum at 80° C. for 12 h.

Material and Electrode Characterization: The X-ray diffraction measurements were taken on Panalytical X'Pert Pro X-ray powder diffractometer using the copper Kα radiation (λ=1.54 Å). Nitrogen sorption isotherms were measured at 77 K with a Micromeritics ASAP 2020 analyzer. The samples were degassed in vacuum at 180° C. for three hours. The specific surface areas ($S_{BET}$) were calculated by the Brunauer-Emmett-Teller (BET) method using adsorption branch in a relative pressure range from 0.04 to 0.25. The pore size distributions (Dp) were derived from the adsorption branches of isotherms using the Barrett-Joyner-Halenda (BJH) model.

Referring to FIGS. 12A, 12B and 12C, scanning electron microscope (SEM) experiments were conducted on a JEOL JSM-6700 FE-SEM. Transmission electron microscopy (TEM) experiments were conducted on a Philips CM120 operated at 120 kV. Exemplary CNT/$V_2O_5$ nanowire composite electrodes according to certain embodiments of the present invention were fabricated with thicknesses as high as several millimeters, as is evidenced by the SEM images (exact thicknesses are difficult to report given the composites' porous structures). Those skilled in the art will recognize that the novel fabrication methods described in the present application allow for great flexibility in engineering electrode thickness, and that the scope of the present invention is not limited to microns- or millimeters-thick electrodes (e.g., electrodes according to embodiments of the present invention were fabricated with thicknesses between 100 nm and several millimeters).

Figure 11A:
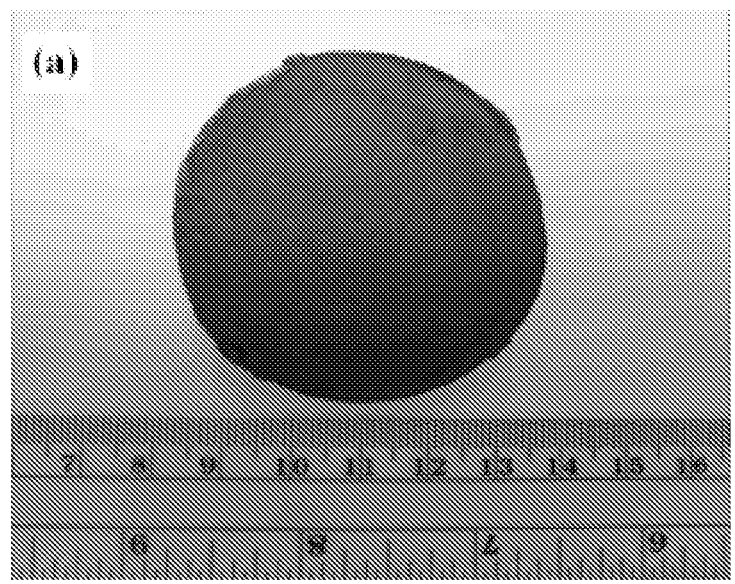
FIGS. 11A and 11B are photographs of (a) a CVC-2 nanocomposite film collected by filtration of the hydrothermal product described below with respect to certain embodiments of the present invention and (b) an electrode made from the composite.
Figure 11B:
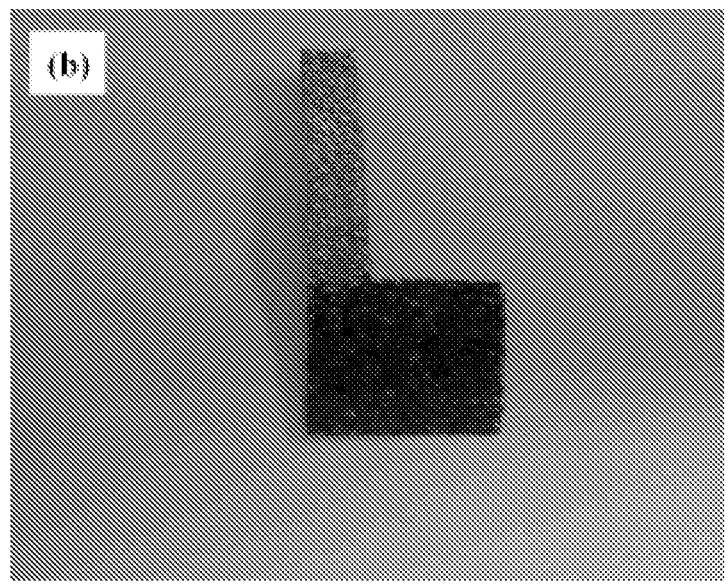

Referring to FIGS. 11A and 11B, the CNT/$V_2O_5$ nanowire composites and $MnO_2$/C were assembled onto foam nickel collectors to fabricate porous electrodes (FIG. 11B). Briefly, 80% of the testing materials, 10% carbon black, and 10% poly(vinylidene fluoride) (PVDF) dispersed in N-methylpyrrolidinone (NMP) were mixed to form slurries. The slurries were ultrasonically treated at 60° C. for 0.5 h, coated on a nickel foam substrate, and dried at 80° C. for 10 min under vacuum. As formed electrodes were then pressed at a pressure of 2 MPa/cm² and further dried under vacuum at 100° C. for 12 h. The electrochemical measurements were conducted in a Princeton VMP3 electrochemistry workstation.

Cyclic voltammetry measurements were conducted in 1 M $Na_2SO_4$ aqueous solution at room temperature using a platinum wire as the counter electrode and an Ag/AgCl electrode as the reference electrode. The specific capacitance (C) of the electrode materials were derived from the formula $C=I/(dE/dt)\approx I/(\Delta E/\Delta t)$, where I is the constant discharge current density, E is cell voltage, and dE/dt is slope of the discharge curve.

From the foregoing it can be seen that the present invention can be embodied in various ways, including, but not limited to, the following:

1. A supercapacitor electrode, comprising: a first network of nanowires; and a second network of nanowires; wherein the first network of nanowires and the second network of nanowires are interpenetrating.
2. The supercapacitor electrode of embodiment 1, wherein the first network of nanowires and the second network of nanowires form hierarchical porous channels, such that substantially all pores in the supercapacitor electrode have diameters less than 20 nm or greater than 100 nm.
3. The supercapacitor electrode of embodiment 2, wherein the first network of nanowires comprises metal oxide nanowires.
4. The supercapacitor electrode of embodiment 3, wherein the second network of nanowires comprises electrically conductive nanowires.
5. The supercapacitor electrode of embodiment 4, wherein the electrode has a thickness greater than 1 micron.
6. The supercapacitor electrode of embodiment 5, wherein metal oxide nanowires are present in the electrode at a concentration of at least 10 wt-%.
7. The supercapacitor electrode of embodiment 6, wherein the electrode has an electrical conductivity of at least 0.01 S/cm.
8. The supercapacitor electrode of embodiment 7, wherein the electrode has a capacitance of at least 440 F/g at a current density of 0.25 A/g.
9. The supercapacitor electrode of embodiment 8: wherein metal oxide nanowires are present in the electrode at a concentration of at least 33 wt-%, and wherein the electrically conductive nanowires are present in the electrode at a concentration of at least 20 wt-%.
10. The supercapacitor electrode of embodiment 9, wherein the electrode has a thickness of at least 1 millimeter.
11. A composite film, comprising: a first network of nanowires; and a second network of nanowires; wherein the first network of nanowires and the second network of nanowires are interpenetrating; wherein the composite film has a thickness of at least 1 micron; and wherein metal oxide nanowires are present in the composite film at a concentration of at least 10 wt-%.
12. The composite film of embodiment 11, wherein the composite film is hierarchically porous, such that substantially all pores in the composite film have diameters less than 20 nm or greater than 100 nm.
13. The composite film of embodiment 12, wherein the composite film has an electrical conductivity of at least 0.01 S/cm.
14. The composite film of embodiment 13, wherein the first network of nanowires comprises carbon nanotubes; and wherein the second network of nanowires comprises metal oxide nanowires.
15. The composite film of embodiment 14, wherein metal oxide nanowires are present in the composite film at a concentration of at least 33 wt-%.
16. A supercapacitor, comprising: a first electrode; a second electrode; and an electrolyte; wherein at least one of the first electrode and the second electrode comprises multiple interpenetrating networks of nanowires and has a substantially microporous and macroporous pore structure.
17. The supercapacitor of embodiment 16: wherein the multiple interpenetrating networks of nanowires comprises a first network of nanowires and a second network of nanowires; wherein the first network of nanowires comprises metal oxide nanowires; and wherein the second network of nanowires comprises electrically conductive nanowires.
18. The supercapacitor of embodiment 17: wherein the metal oxide nanowires are present at a concentration of at least 33 wt-% in the multiple interpenetrating networks of nanowires; and wherein the multiple interpenetrating networks of nanowires have an electrical conductivity of at least 0.01 S/cm.
19. The supercapacitor of embodiment 18: wherein the metal oxide nanowires are vanadium-oxide nanowires; and wherein the electrically conductive nanowires are carbon nanotubes.
20. The supercapacitor of embodiment 19, wherein at least one of the first electrode and the second electrode is electrically conductive and has a capacitance of at least 440 F/g at a current density of 0.25 A/g.

The present invention has been described above with reference to preferred features and embodiments. Those skilled in the art will recognize, however, that changes and modifications may be made in these preferred embodiments without departing from the scope of the present invention. For example, composite electrodes according to certain embodiments of the present invention may comprise interpenetrating networks of CNTs and other nanowires (e.g., those formed from metal oxides such as $MnO_2$, $Co_3O_4$ and/or NiO). All references cited anywhere in this specification are hereby incorporated herein by reference.

It will be appreciated from the foregoing that the present invention may be employed in not only supercapacitor applications, but in other applications as well (e.g., batteries, battery-type supercapacitors, etc.). Furthermore, although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Surface area, pore volume and pore size of the CNTs. $V_2O_5$ nanowires and their composites.

| Samples | Surface area ($m^2/g$) | Pore volume ($cm^3/g$) | Average pore size (nm) |
|---|---|---|---|
| CNTs | 156 | 0.488 | 12.5 |
| CVC-1 | 108 | 0.639 | 20.9 |
| CVC-2 | 125 | 0.445 | 15.2 |
| CVC-3 | 144 | 0.645 | 17.8 |
| CVC-4 | 142 | 0.486 | 13.7 |
| $V_2O_5$-nanowire | 83 | 0.552 | 26.7 |

What is claimed is:

1. A supercapacitor electrode, comprising:
a first network of nanowires; and
a second network of nanowires;
wherein the first network of nanowires and the second network of nanowires are interpenetrating; and
wherein the first network of nanowires and the second network of nanowires form hierarchical porous channels, such that substantially all pores in the supercapacitor electrode have diameters less than 20 nm or greater than 100 nm.

2. The supercapacitor electrode of claim 1, wherein the first network of nanowires comprises metal oxide nanowires.

3. The supercapacitor electrode of claim 2, wherein the second network of nanowires comprises electrically conductive nanowires.

4. The supercapacitor electrode of claim 3, wherein the electrode has a thickness greater than 1 micron.

5. The supercapacitor electrode of claim 4, wherein metal oxide nanowires are present in the electrode at a concentration of at least 10 wt-%.

6. The supercapacitor electrode of claim 5, wherein the electrode has an electrical conductivity of at least 0.01 S/cm.

7. The supercapacitor electrode of claim 6, wherein the electrode has a capacitance of at least 440 F/g at a current density of 0.25 A/g.

8. The supercapacitor electrode of claim 7:
wherein metal oxide nanowires are present in the electrode at a concentration of at least 33 wt-%; and
wherein the electrically conductive nanowires are present in the electrode at a concentration of at least 20 wt-%.

9. The supercapacitor electrode of claim 8, wherein the electrode has a thickness of at least 1 millimeter.

10. A composite film, comprising:
a first network of nanowires; and
a second network of nanowires;
wherein the first network of nanowires and the second network of nanowires are interpenetrating;
wherein the composite film has a thickness of at least 1 micron; and
wherein metal oxide nanowires are present in the composite film at a concentration of at least 10 wt-%.

11. The composite film of claim 10, wherein the composite film is hierarchically porous, such that substantially all pores in the composite film have diameters less than 20 nm or greater than 100 nm.

12. The composite film of claim 11, wherein the composite film has an electrical conductivity of at least 0.01 S/cm.

13. The composite film of claim 12:
wherein the first network of nanowires comprises carbon nanotubes; and
wherein the second network of nanowires comprises metal oxide nanowires.

14. The composite film of claim 13, wherein metal oxide nanowires are present in the composite film at a concentration of at least 33 wt-%.

15. A supercapacitor, comprising:
a first electrode;
a second electrode; and
and an electrolyte;
wherein at least one of the first electrode and the second electrode comprises multiple interpenetrating networks of nanowires and has a substantially microporous and macroporous pore structure.

16. The supercapacitor of claim 15:
wherein the multiple interpenetrating networks of nanowires comprises a first network of nanowires and a second network of nanowires;
wherein the first network of nanowires comprises metal oxide nanowires; and
wherein the second network of nanowires comprises electrically conductive nanowires.

17. The supercapacitor of claim 16:
wherein the metal oxide nanowires are present at a concentration of at least 33 wt-% in the multiple interpenetrating networks of nanowires; and
wherein the multiple interpenetrating networks of nanowires have an electrical conductivity of at least 0.01 S/cm.

18. The supercapacitor of claim 17:
- wherein the metal oxide nanowires are vanadium-oxide nanowires; and
- wherein the electrically conductive nanowires are carbon nanotubes.

19. The supercapacitor of claim 18, wherein at least one of the first electrode and the second electrode is electrically conductive and has a capacitance of at least 440 F/g at a current density of 0.25 A/g.

* * * * *